(12) United States Patent
Richter et al.

(10) Patent No.: US 12,554,622 B1
(45) Date of Patent: *Feb. 17, 2026

(54) COMPLIANCE ENFORCEMENT TOOL FOR COMPUTING ENVIRONMENTS

(71) Applicant: Progress Software Corporation, Burlington, MA (US)

(72) Inventors: Christian Dominik Richter, San Francisco, CA (US); Christoph Thomas Hartmann, Berlin (DE)

(73) Assignee: Progress Software Corporation, Burlington, MA (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/479,692

(22) Filed: Oct. 2, 2023

Related U.S. Application Data

(63) Continuation of application No. 16/543,515, filed on Aug. 17, 2019, now Pat. No. 11,797,424, which is a
(Continued)

(51) Int. Cl.
*G06F 11/3668* (2025.01)
*G06F 8/33* (2018.01)
(Continued)

(52) U.S. Cl.
CPC ............ *G06F 11/3676* (2013.01); *G06F 8/33* (2013.01); *G06F 8/34* (2013.01); *G06F 11/3608* (2013.01);
(Continued)

(58) Field of Classification Search
CPC .............................. G06F 11/3676; G06F 8/33
See application file for complete search history.

(56) References Cited

U.S. PATENT DOCUMENTS

| | | | | |
|---|---|---|---|---|
| 8,276,123 B1 * | 9/2012 | Deng | .................... | G06F 11/368 |
| | | | | 717/124 |
| 8,621,550 B1 * | 12/2013 | Yehuda | .................. | H04L 43/50 |
| | | | | 713/168 |

(Continued)

*Primary Examiner* — Duy Khuong T Nguyen
*Assistant Examiner* — Theodore E Hebert
(74) *Attorney, Agent, or Firm* — Patent Law Works LLP

(57) ABSTRACT

Techniques are described for managing creation and/or implementation of compliance-based procedures and policies for computing environments executing software programs using computing resources. In at least some situations, the described techniques include performing one or more defined compliance tests on a target computing environment by employing user-defined and/or predefined compliance profiles to test one or more computing resources in the target computing environment. Profiles typically include one or more user-defined or predefined controls that each includes one or more compliance tests, which in turn utilize one or more user-defined or predefined testing-implementation modules to execute the tests. Profiles can introduce dependencies so that one profile can access and utilize the controls or testing-implementation modules in other profiles. A user can dynamically execute a profile, and/or profiles can be scheduled for execution (e.g., so that multiple target computing environments can be tested simultaneously or at different times).

20 Claims, 8 Drawing Sheets

Related U.S. Application Data continuation of application No. 15/799,633, filed on Oct. 31, 2017, now Pat. No. 10,430,317.

(60) Provisional application No. 62/416,560, filed on Nov. 2, 2016.

(51) Int. Cl.
  *G06F 8/34* (2018.01)
  *G06F 11/3604* (2025.01)
  *G06F 11/3698* (2025.01)

(52) U.S. Cl.
  CPC ...... *G06F 11/3692* (2013.01); *G06F 11/3698* (2025.01)

(56) References Cited

U.S. PATENT DOCUMENTS

| | | | | |
|---|---|---|---|---|
| 10,430,317 | B2 * | 10/2019 | Richter | G06F 11/3664 |
| 11,797,424 | B2 * | 10/2023 | Richter | G06F 8/33 |
| 2006/0247885 | A1 * | 11/2006 | Manfredi | G16H 10/40 |
| | | | | 702/120 |
| 2008/0189094 | A1 * | 8/2008 | Adir | G06F 11/3684 |
| | | | | 703/14 |
| 2010/0058114 | A1 * | 3/2010 | Perkins | G06Q 10/06 |
| | | | | 714/39 |
| 2011/0197176 | A1 * | 8/2011 | Muharsky | G06F 11/3672 |
| | | | | 717/113 |
| 2011/0252401 | A1 * | 10/2011 | Charisius | G06F 8/36 |
| | | | | 717/110 |
| 2012/0072968 | A1 * | 3/2012 | Wysopal | G06F 21/577 |
| | | | | 726/1 |
| 2012/0084769 | A1 * | 4/2012 | Adi | G06F 8/63 |
| | | | | 717/174 |
| 2013/0086556 | A1 * | 4/2013 | Grechanik | G06F 11/3684 |
| | | | | 717/126 |
| 2013/0132777 | A1 * | 5/2013 | Froehlich | G06F 11/3688 |
| | | | | 714/E11.178 |
| 2014/0013313 | A1 * | 1/2014 | Eker | G06F 8/436 |
| | | | | 717/132 |
| 2014/0068340 | A1 * | 3/2014 | Dayal | H04L 41/5096 |
| | | | | 714/38.1 |
| 2018/0121333 | A1 * | 5/2018 | Richter | G06F 11/3676 |
| 2019/0370157 | A1 * | 12/2019 | Richter | G06F 11/3608 |

* cited by examiner

Example Portion Of Profile

⋮

280

```
describe port(80) do
      it { should_not be_listening }
      its('criticality') { should be_high }
      end
describe port(443) do
      it { should be_listening }
      its('protocols') {should include 'tcp'}
end
```

⋮

Example Command Prompt In CET System Interface To Execute Profile On Local Computing Environment

281

$ <CET> exec examples/profile

Example Results From Execution Of Profile

282

Profile: <CET> Example Profile (profile)
                            Version: 1.0.0
                                  Target:  local://

\*\*\*\*\*\*\*\*\*\*\*\*\*\*HIGH FAILURE\*\*\*\*\*\*\*\*\*\*\*\*\*\*\*\*
-1.0: check port(80)
    X  port(80) should not be listening
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
-1.0: check port(443)
    ✓  port(443) should be listening Profile Summary: 1 successful, 1 failures, 0 skipped

FIG. 2C

COMPLIANCE ENFORCEMENT TOOL FOR COMPUTING ENVIRONMENTS

CROSS-REFERENCE TO RELATED APPLICATIONS

This application is a continuation of U.S. patent application Ser. No. 16/543,515, filed Aug. 17, 2019 and entitled "Compliance Enforcement Tool For Computing Environments", which claims priority to U.S. patent application Ser. No. 15/799,633, filed Oct. 31, 2017 and entitled "Compliance Enforcement Tool For Computing Environments", which claims the benefit of U.S. Provisional Patent Application No. 62/416,560, filed Nov. 2, 2016 and entitled "Compliance Enforcement Tool For Computing Environments," which is hereby incorporated by reference in its entirety.

BACKGROUND

Software program development and deployment techniques have, in many cases, evolved from using traditional monolithic standalone software programs to instead using groups of interconnected smaller programs, with some or all such smaller programs referred to in some situations as "services" that are part of a larger service-oriented architecture or environment in which multiple services work together to provide a larger coordinated functionality. While such service-oriented architectures and environments provide some benefits, they also introduce a variety of complexities and other problems.

An additional type of functionality that provides some benefits but also creates increased complexity as well as other problems includes the use of virtualization techniques. For example, virtualization technologies such as those provided by XEN, VMWare, or User-Mode Linux may allow a single physical computing system to be shared among multiple users by providing each user with one or more virtual machines hosted by the single physical computing system, with each such virtual machine being a software simulation acting as a distinct logical computing system that provides users with the illusion that they are the sole operators and administrators of a given hardware computing resource, while also providing application isolation among the various virtual machines.

Another type of functionality that provides some benefits but also creates increased complexity and further problems includes the use of online execution environments that some companies implement to execute programs for and provide other benefits to customers, which may in some circumstances be referred to as providing platform as a service ("PaaS") functionality, software as a service ("SaaS") functionality, and/or infrastructure as a service ("IaaS") functionality, or more generally referred to at times as "cloud computing". Such an online execution environment typically operates computer networks that interconnect numerous computing systems to support their operations, such as with at least some of the computing systems being co-located in one or more data centers (whether private data centers that are operated by and on behalf of a single organization, or public data centers that are operated by entities as businesses for multiple customers). Some public data center operators provide network access, power, and secure installation facilities for hardware owned by various customers, while other public data center operators provide "full service" facilities that also include hardware resources made available for use by their customers.

As each of these different types of computing environments increases in complexity, so too does the coordination and determination that each service, functionality, or the computing environment is in compliance with one or more regulatory, industry or company standards. Different versions, configuration changes, updates, failed computing systems, etc. can alone or in combination result in one or more aspects of the computing environment being out of compliance with one or more such standards. Moreover, various different groups involved with the software lifecycle (e.g., development, operations, security, and compliance teams) may utilize different terminology or rules to determine if the software is compliant with the regulatory and company standards. However, as the use of service-oriented architectures, online execution environments and virtualization technologies has increased, solutions to address the resulting complexities and other problems associated with compliance testing have not been fully developed.

BRIEF DESCRIPTION OF THE DRAWINGS

FIGS. 2A-2C illustrate examples of compliance profiles and their use, including specifying dependencies between profiles.

DETAILED DESCRIPTION

Figure 1:
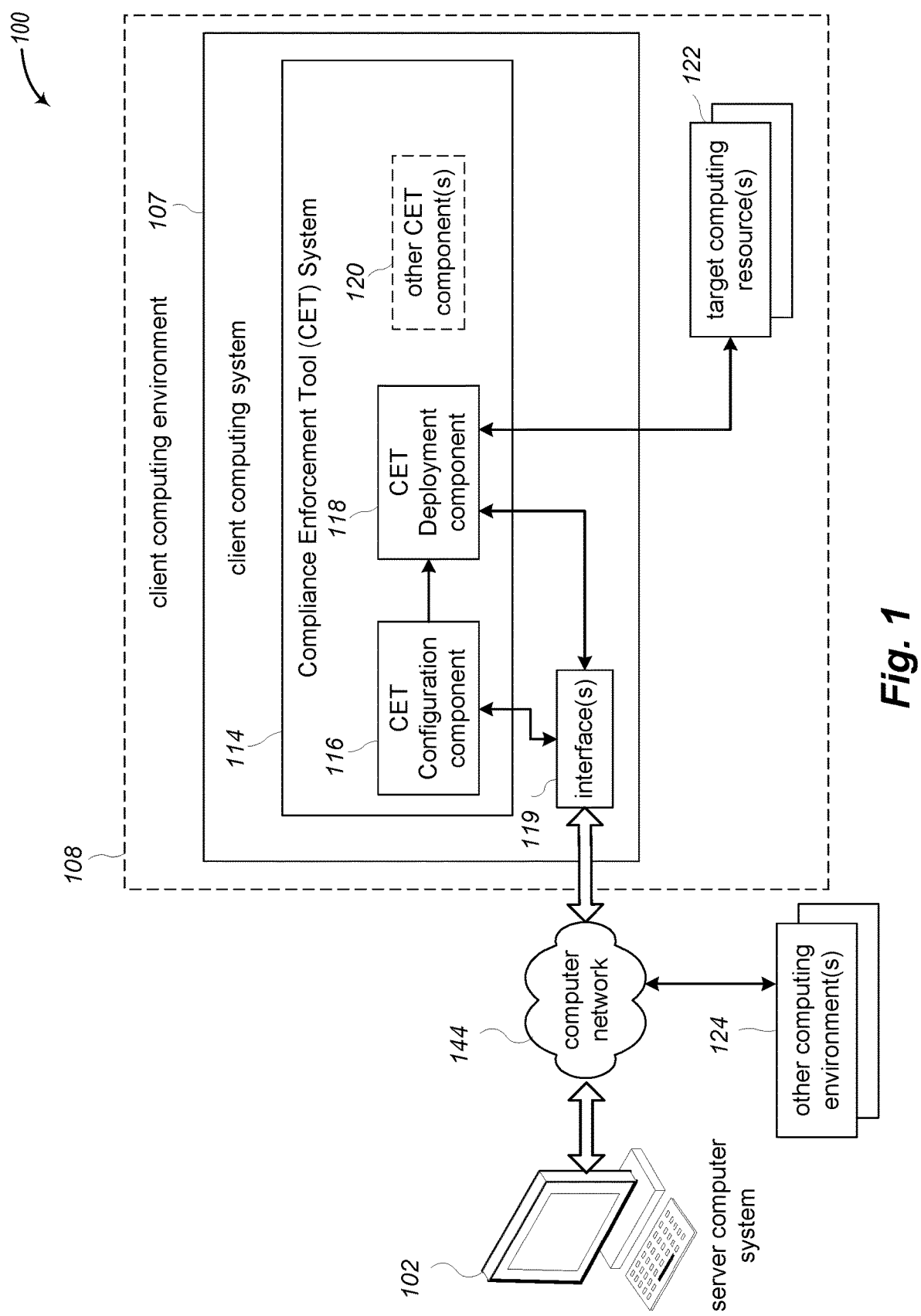
FIG. 1 is a network diagram illustrating an example embodiment of an environment in which multiple computing systems execute software programs in accordance with described techniques for performing compliance testing.

Techniques are described for managing creation and/or implementation of compliance-based procedures and policies for computing environments that are executing software programs using computing resources, such as for a computing environment that includes one or more server computers, applications, databases or files or other data structures, distributed or virtualized computing systems, and/or other computing resources. Throughout the lifecycle of a software program (e.g., development, testing, deployment, and updating/maintenance), various aspects of the software may be examined to determine if they are in compliance with certain standards or other specified compliance criteria, such as, for example, ensuring that a web server is only listening on well-secured ports, ensuring that insecure services and protocols (e.g., telnet) are not used, determining if a file or data to be accessed actually exists, etc. These compliance criteria are often determined or specified by one or more of government regulations, industry standards and corporate policies. In at least some embodiments, the described techniques include performing one or more defined compliance tests on a target computing environment in an automated manner to enable any non-compliance problems to be detected and corrected before they impact the operation or success of one or more software programs in the target computing environment. Additional details related to embodiments of such described techniques are included below, and at least some of the described techniques may be performed in some embodiments by automated operations of a Compliance Enforcement Tool ("CET") system, as discussed further below.

In at least some embodiments, the CET system enables the use of defined compliance profiles to perform compliance tests on specified target computing resources in a target computing environment. Such a defined compliance profile typically includes one or more controls and one or more testing-implementation modules (TIMs). Each such control may, for example, define one or more compliance tests to perform, and execute such a defined compliance test by employing one or more TIMs (whether predefined and/or user-defined TIMs). Each such TIM typically performs one or more specified actions, such as to check one or more configuration files or to check status or other response information from executing one or more commands, although other actions can also be performed by a TIM.

After one or more such compliance profiles are selected or otherwise specified for use with a particular computing environment, a user can dynamically and interactively execute one or more of those profiles (e.g., via a command-line interface, or "CLI"; graphical user interface, or "GUI"; or other interface) in at least some embodiments, and/or one or more of those profiles can be scheduled for execution at specified times and/or upon the occurrence of specified events (e.g., as part of the testing and/or deployment process) in at least some embodiments, including to allow multiple target computing environments to be tested simultaneously or at different times. Additional details are included below regarding execution and other use of compliance profiles via the CET system.

The defined compliance profiles may, in at least some embodiments, include predefined profiles provided as part of the CET system and user-defined profiles that a customer or other user of the CET system specifies for use in one or more target computing environments of the user. With respect to predefined profiles, as well as predefined TIMs for use in predefined and/or user-defined profiles, examples of such predefined profiles include, but are not limited to, compliance tests for use with the following types of computing server environments: Basic Apache 2; Basic Linux; Basic MySQL; Basic PostgreSQL; Basic SSH; Windows Base Security; CIS Ubuntu 14.04 LTS Server Benchmark Level 1; CIS Ubuntu 14.04 LTS Server Benchmark Level 2; etc. Each of these predefined profiles performs one or more compliance tests based on various industry standards for a particular use. Examples of predefined TIMs include, but are not limited to, commands and other actions such as the following: apache_conf; apt; audit_policy; auditd_conf; auditd_rules; bash; bond; bridge; bsd_service; command; csv; directory; etc_group; etc_passwd; etc_shadow; file; gem; group; grub_conf; host; iis_site; inetd_conf; ini; interface; iptables; json; kernel_module; kernel_parameter; launchd_service; limits_conf; login_def; mount; mysql_conf; mysql_session; npm; ntp_conf; oneget; os; os_env; package; parse_config; parse_config_file; pip; port; postgres_conf; postgres_session; powershell; process; registry_key; runit_service; security_policy; service; ssh_config; sshd_config; ssl; sys_info; systemd_service; sysv_service; upstart_service; user; users; vbscript; windows_feature; wmi; xinetd_conf; yaml; yum. Each of these TIMs checks one or more computing resource of a target computing environment. For example, the predefined "port" TIM may be utilized to check basic port properties, such as port, process, or if it is listening, whereas, the predefined "interface" TIM may be utilized to check basic network adapter properties, such as name, status, state, address, and link. The TIMs can be defined in at least some embodiments in general terms or actions independent of a specific target computing environment associated with the implementation of the compliance test. For example, using the predefined "port" TIM example above, this TIM can be defined to check a specific port regardless of whether the target computing environment is RedHat, Ubuntu, or some other computing environment, which can allow the same profile to be implemented on different computing environments without having to reconfigure the profile. A control that utilizes a TIMs (whether predefined or user-defined) adheres to the syntax of the TIM and the type of information the TIM provides back to the control. The results of the control can then, in various embodiments, be stored for later use, provided to a user, and/or utilized to perform other automated operations, such as automated actions to correct non-compliant resources. Additional details are included below regarding examples of a CET system and its predefined compliance profiles, controls and TIMs.

In addition, a user of the CET system can define or otherwise specify particular user-defined compliance profiles, controls, and/or TIMs based on the user's own compliance criteria. In this way, the user can develop customized compliance tests for their particular target computing resources and computing environment(s), such as to manage additional types of computing resources and/or to perform additional types of tests or other checks. For example, a user can define a profile to check various characteristics of a particular file, such as a custom file that is used by one or more software programs in the user's computing environment. The user can further specify one or more controls (user-defined or predefined controls) in that profile, optionally after defining any new user-defined controls to be included. For example, a first control specified for the user-defined compliance profile may be to test to see if the file exists, and a second control specified for the user-defined compliance profile may be to check the version and size of the file. The first control may, for example, be a predefined control that is customized to utilize the name and path of the file, to determine if the file system in the user's computing environment actually has a file with the given name at the given path, and may call the predefined "file" TIM, which checks and returns response information to indicate whether that file is in the specified directory or not. The second control may, for example, be defined by the user to use a custom TIM to check if the version of the file is a particular version and if the file size is over a particular amount, such as if predefined TIMs to perform one or more such checks are not available. When executed, the custom TIM performs the necessary computer operations to check the version number and the size of the file, and provides the results back to the user-defined second control as response information. The second control then compares the results against user-defined conditions to determine if the file is in compliance with the user-defined compliance profile.

In at least some embodiments, compliance profiles may also be specified to depend on other compliance profiles (whether user-defined and/or predefined). In this way, one profile can, for example, utilize user-defined TIMs or controls that are present in another profile from which it depends. Each user-defined profile may, for example, identify one or more profile dependencies. The user-defined profile then has access to each of the TIMs in those profiles from which the user-defined profile depends. Once a new user-defined profile depends on other profiles, the new profile can also specify controls in those depended-upon profiles for use in the new user-defined profile. The new user-defined profile can be specified to access all of the controls or specific controls in those other depended-upon profiles. In this way, the new profile can perform tests that were previous developed in other profiles. The order of these dependencies is used in at least some embodiments as a hierarchy of which profiles have a higher priority over other profiles, such that a first profile has a highest (or alternatively, lowest) priority. For example, in some embodiments, all TIMs are exported from the depended-upon profiles and usable by the dependent profile, regardless of the hierarchy of profile dependencies, but the controls from the top-level profile are automatically inherited by the dependent profile with other controls from the lower-level profile not being automatically inherited by being specified by the user, such as through the use of include_controls or require_controls features, described elsewhere herein. Predefined profiles can also depend on other predefined profiles in at least some embodiments. Moreover, controls inherited into a new profile from a depended-upon profile may or may not be implemented based on the type or functionality of the inherited control and the target computing environment in which the new profile is implemented. For example, a new profile may inherit a control for a Linux-based system, but the new profile may be implemented on a Windows-based system. Accordingly, the CET system may in some embodiments ignore this inherited Linux-based control since it would result in an error in the Windows-based target computing environment. In this way, profiles and/or controls can be defined for multiple different types of target computing environments, and when a profile is implemented in a target computing environment, those controls that are applicable to the target computing environment are executed while ignoring the other controls that are not applicable to the target computing environment.

The described techniques for using compliance profiles to test target computing environments in user-configurable manners provide a great amount of flexibility and reusability of the various defined tests, while also allowing compliance testing to be employed as needed (e.g., on a continuous basis during development, testing, deployment and/or use, or instead upon the occurrence of defined types of events or at scheduled times). For example, as one or more pieces of software are developed, tested, deployed and/or updated, compliance profiles can be periodically executed to determine if the software program(s) have changed some aspect of the particular computing resources being tested. Additionally, the use of these compliance profiles enables different groups associated with the software program(s) to perform the same or similar compliance tests using the same terminology and compliance criteria. In this way, as the software lifecycle advances, the same compliance tests can be utilized to ensure that the various aspects of the software program(s), when working together, continue to satisfy those compliance criteria. The utilization of profile dependencies as discussed herein further allows for the quick and easy migration of compliance tests from one system to another or from one project to another, which can reduce errors and other issues as the software is developed and deployed.

FIG. 1 is a network diagram illustrating an example environment in which one or more computing systems may provide execution capabilities and perform defined compliance testing activities, such as under the control of a CET system. In particular, in this example, a CET system 114 is executing on one or more client computing systems 107, such as in a client computing environment 108 that includes the client computing system(s) 107 and one or more additional target computing resources 122.

In this example, the CET system 114 includes a CET Configuration component 116 to configure one or more compliance profiles, and a CET Deployment component 118 to deploy the one or more compliance profiles on one or more target computing environments (e.g., the client computing environment 108 and/or other computing environment(s) 124). A target computing environment may include a virtual or physical computing machine, an API, HTTP endpoint or other connection endpoint, or other computing structures or components. In addition, the target computing environment may include one or more computing resources that are provided by and under the control of the client who is executing a local copy of the CET system, and/or may include one or more computing resources that are provided by and under the control of another entity (e.g., an online program execution service) but are currently available to the client.

A user (not shown) of the client computing system(s) 107 can interact with the CET system 114 via an interface 119, such as by having direct access to the client computing system(s) or by remotely communicating with the client computing system(s) over one or more computer networks 144. The user can specify, via the interface 119 and the CET Configuration component 116, one or more compliance profiles (whether user-defined profiles and/or predefined profiles), one or more controls included in the profile(s) (whether user-defined controls and/or predefined controls), and/or one or more testing-implementation modules (TIMs) that are used by the control(s) (whether user-defined TIMs and/or predefined TIMs). Such user-specified profiles, controls and/or TIMs may be stored (e.g., on the client computing system), and may be used by the CET system to perform compliance testing. For example, the user can schedule or instruct, via the interface 119 and the CET Deployment component 118, the CET system 114 to deploy one or more compliance profiles for one or more computing resources in one or more computing environments, which can return results from such deployment to the user via the interface 119 and/or to the CET system for further automated operations. As discussed in greater detail with respect to FIG. 3, the client computing system(s) 107 may also have one or more local attached storage devices (not shown), such as to store local copies of the CET system 114, the profiles, controls, TIMs, results from deployment of the profiles, etc.

In some embodiments, the CET system 114 may be downloaded onto the client computing system(s) 107 by a client, such as from a remote server computer system 102 via a computer network 144. In other embodiments, the CET System 114 may be implemented (not illustrated) on the server computer system 102, and one or more users of one or more client computing systems (e.g., the client computing system(s) 107) can interact with the CET system 114 on the server computer system 102 over one or more computer networks 144, such as if the CET system is providing an online CET service that is available to the one or more users, and that is used by the user(s) to perform compliance testing on computing environments local to those users (e.g., client computing environment 108) and/or on other computing environments (e.g., computing environments 124, such as may be provided by one or more online program execution service or other online services that provide computing resources to customers). The computer network 144 may include one or more internal or external networks to the client computing environment and may include various different networking components (e.g., network proxies, load balancers, network address translation devices, etc.).

In this example, the CET System 114 also optionally includes other CET component(s), which may be utilized to assist the CET Configuration component 116 or the CET Deployment component 118 in performing their functionality, or it may perform other supporting functionality of the CET system 114, such as managing results from compliance tests, enabling the execution of actions to address or correct non-compliance resources, performing administrative activities involving user registration and account management, etc.

For illustrative purposes, some embodiments are described below in which specific types of compliance testing is specified and deployed in specific ways, such as for specific types of programs executing on specific types of computing systems or otherwise using specific types of computing resources. These examples are provided for illustrative purposes and are simplified for the sake of brevity, and the inventive techniques can be used in a wide variety of other situations, some of which are discussed below, and the techniques are not limited to use with virtual machines, a service-oriented architecture, data centers or other specific types of computing systems or computing system arrangements.

Figure 2A:
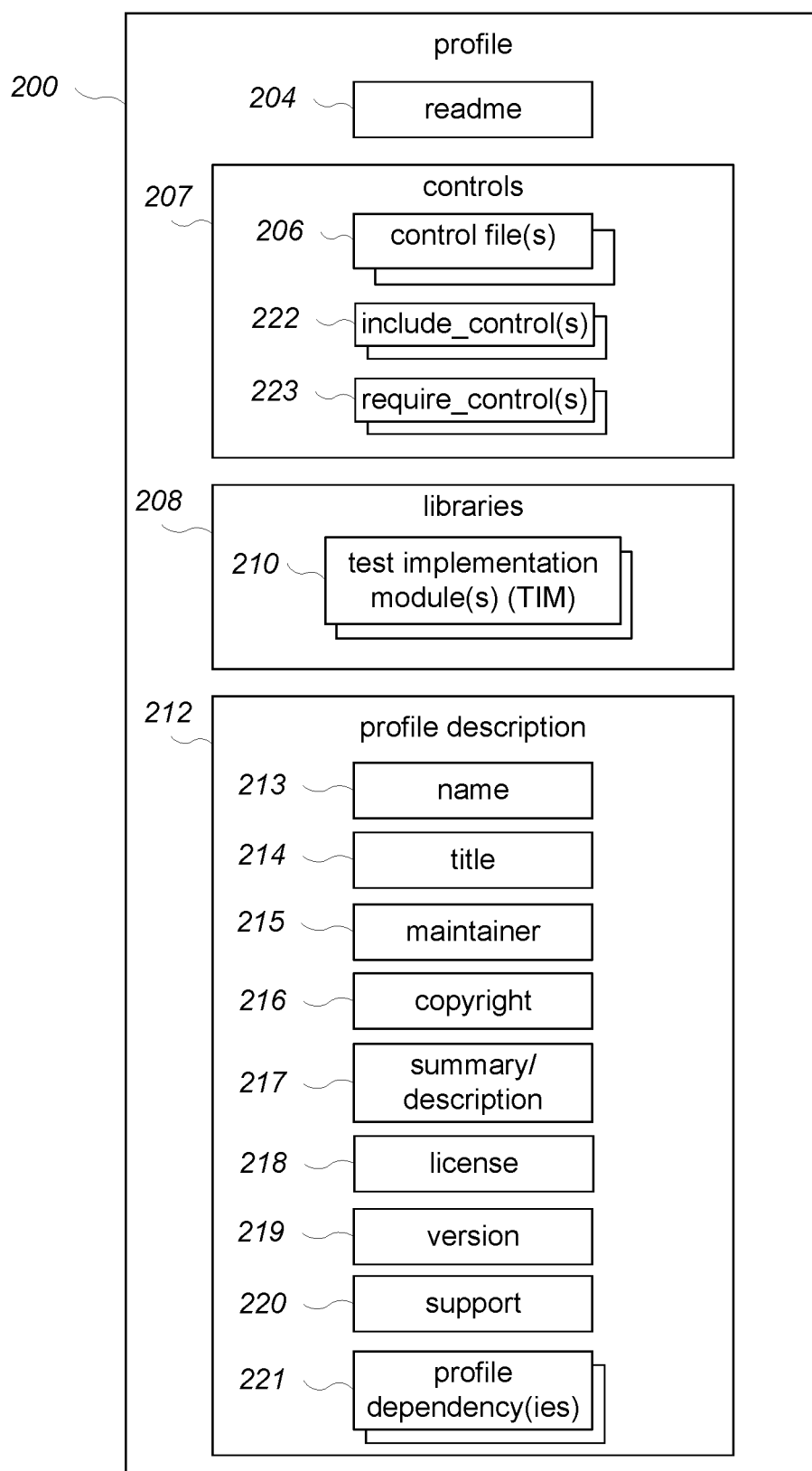
Figure 2B:
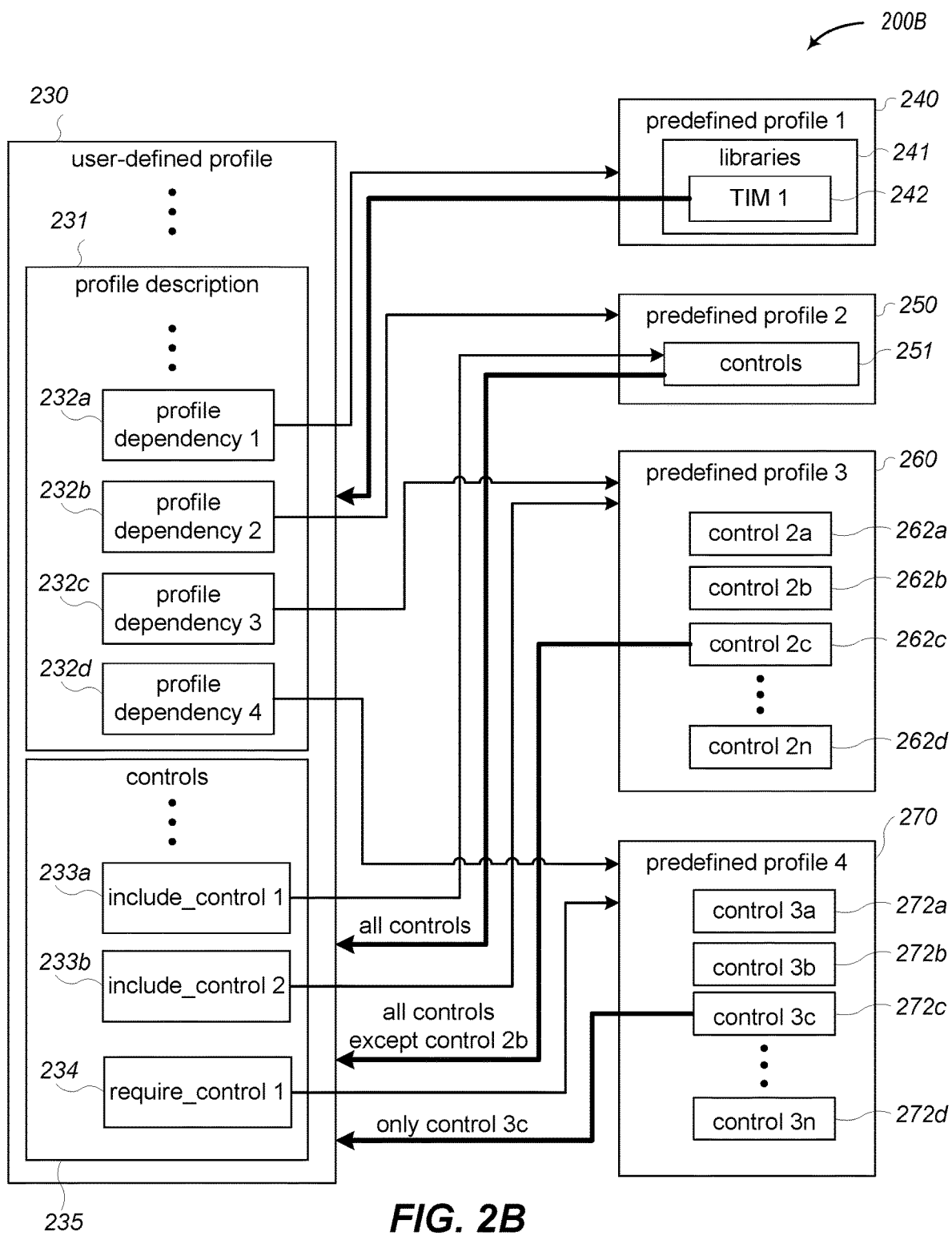

FIGS. 2A-2B illustrate examples of structures of compliance profiles and techniques for creating dependencies between profiles. In these example embodiments, the CET system supports the creation of complex compliance tests through the use of compliance profiles. These profiles organize the controls that perform the tests, which support dependency management and code reuse. Each profile is a standalone structure with its own distribution and execution flow.

FIG. 2A illustrates the structure of an example profile 200, although other structures and elements may be utilized with similar functionality. Briefly, the profile 200 has the following structure:

README 204
controls 207
example.rb control etc.rb
libraries 208
extension.rb profile
configuration 212

The README 204 includes a description of the profile, which is used to explain the profile, its scope, and its usage, such as for the benefit of users of the CET system. The controls 207 include control file(s) 206, include_control(s) 222, and require_control(s) 223. The control file(s) 206 are programming files in these example embodiments that, when called and executed, perform one or more compliance tests on one or more target computing resources (e.g., as specified in the control). Each control 206 can be a user-defined control or a predefined control that is incorporated into the CET system, and can be utilized by any profile. Each control 206 utilizes one or more testing-implementation modules (TIMs) to execute the test defined by the control. Similar to the predefined controls, the predefined TIMs are incorporated into the CET system and can be utilized by any control. The library 208 stores user-defined TIMs 210. For a control 206 in a particular profile to utilize a user-defined TIM 210, the user-defined TIM 210 is included in the libraries 208 of that same profile, or is incorporated into the profile by a dependency on another profile that includes the TIM, as described in more detail below. The include_ control(s) 222 identifies a group of controls from a profile dependency that can be utilized by the profile, which is described in more detail below. The require_control(s) 223 specifies one or more particular controls from a profile dependency, which is described in more detail below.

The profile configuration 212 in this example is a file that specifies at least a unique name 213 for the profile. The profile configuration may optionally also include some or all of the following information: title 214, maintainer 215, copyright 216, summary/description 217, license 218, version 219, support 220, and profile dependency(ies) 221. The title 214 specifies a human-readable name for the profile. The maintainer 215 identifies one or more clients or users that created, updates, or otherwise maintains the profile, and may optionally include support contact information for the profile. The copyright 216 identifies the copyright holder of the profile. The summary/description 217 includes a one-line summary and/or a multiple-line description of the profile and its functions, uses, and/or outputs. The license 218 specifies the license for the profile, such as an open-source license. The version 219 specifies the current version of the profile, and may optionally include a history of previous versions. The support 220 identifies a list of supported computing environments or other platform targets for the test in the profile. The profile dependency(ies) 221 define a list of zero or more profiles on which this profile depends, which is described in more detail below. The support 220 specifies one or more platforms that a profile is targeting for compliance testing. The list of supported platforms may contain simple names, names and versions, or detailed flags, and may be combined arbitrarily. For example, the support setting may define "as-name: debian" (to target anything running Debian Linux), "as-name: ubuntu; release: 14.04" (to target only Ubuntu version 14.04), "as-family: redhat" (to target the entire RedHat platform), "platform: aws" (to target anything running on Amazon AWS), etc. One or more of these platforms, or other supported platforms, may be targeted by a single profile configuration in a single profile.

Profiles can be standalone profiles or they can depend on other profiles. A profile dependency can be sourced from a path (e.g., a profile that is stored locally to where the CET system is executing), a URL (e.g., a profile that is stored remotely and accessible via an HTTP-based or HTTPS-based URL), a git repository, or other profile data store. The following is an example of a portion of a profile that depends on five other profiles. depends:

name: ssh-hardening
supermarket: hardening/ssh-hardening version: '=2.0.0'
name: as-hardening
url: https://github.com/dev-sec/tests-os-example/master-
.zip
name: ssl-benchmark
git: https://github.com/dev-sec/ssl-benchmark.git version: '<2.0'
name: windows-patch-benchmark
git: https://github.com/bob/windows-patch-bench-
mark.git version: '~>0.6'
name: linux
compliance: base/linux When a profile is executed by the CET system in this example, its profile configuration file will be read in order to source any profile dependencies. The CET system will then cache the dependencies locally and may generate a lock file, which may need to be refreshed if a dependency is added or changed in the profile configuration file. Accordingly, the profile can create a hierarchical dependency structure with other profiles based on their listed order in the profile. In this way, various controls or user-defined TIMs in one profile may be used in another profile, which promotes code reuse and consistency between the various groups involved with the software lifecycle that may execute compliance testing. All of the TIMs from a listed dependency are available for use in a profile by default in this example. If two dependencies provide a TIM with the same name, the profile can include an instruction to disambiguate the two (e.g., to specify which one to use in lieu of the other, to specify an alternative name to use for the TIM in the lower-priority depended-upon profile, etc.), which allows utilization of TIMs from two separate profiles, even though they have the same name in their respective profiles. Profiles may also include attributes (e.g., to define secrets, such as user names and passwords, which should not otherwise be stored)—if so, a variable is specified in the control of the profile for each secret, the secret is then added to a file located on the local machine, and the user can then specify the path to the file in the CET system.

When a profile is executed through the CET system in this example, the profile may incorporate controls that are defined in other profiles. In various embodiments, the controls 207 can define include_control(s) 222 to import all controls from the named profile (i.e., the depended-upon profile). For example, to include controls from the "cis-level-1 profile" when running the "cis-fs-2.7 profile," the "cis-fs-2.7 profile" can define: include controls 'cis-level-1' do control "cis-fs-2.

7" do impact 1.0 end

In another example, to include controls from the "cis-level-1 profile" when running the "cis-fs-2.7 profile," but to skip two controls within "cis-level-1 profile," the "cis-fs-2.7 profile" can define:

include controls 'cis-level-1' do skip_control "cis-fs-2.1" skip_control "cis-fs-2.2"

end

In other embodiments, a profile can require specific controls defined in another profile. For example, the profile configuration file can define a require_controls keyword that imports specific controls or rules from the named profile (i.e., the depended-upon profile). For example, to require that controls "cis-fs-2.1" and "cis-fs-2.2" be loaded from the "cis-level-1" profile into the "cis-fs-2.7 profile," the "cis-fs-2.7 profile" can define:

require_controls 'cis-level-1' do control "cis-fs-2.1" control "cis-fs-2.2"

end

An example of a profile and its execution and results is further illustrated and discussed in conjunction with FIG. 2C.

FIG. 2B illustrates an example of a user-defined profile 230 that has multiple dependencies to a plurality of pre-defined profiles 240, 250, 260 and 270. User-defined profile 230 includes a profile configuration 231, along with other elements of the profile as described above, which are not illustrated for ease of discussion. The profile configuration 231 includes profile dependencies 232a-232d. The profile dependency 232a references predefined profile 240, the profile dependency 232b references predefined profile 250, the profile dependency 232c references predefined profile 260, and the profile dependency 232d references predefined profile 270. These dependencies enable the controls of the user-defined profile 230 (not illustrated) to utilize any TIM from the predefined profiles 240, 250, 260, or 270, which is illustrated by TIMs 242 in the library 241 of the predefined profile 240 being available to the user-defined profile 230. Although not illustrated for ease of discussion, the TIMs from predefined profiles 250, 260, and 270 are also available to the user-defined profile 230. It should also be noted that the user-defined profile may depend on predefined profiles or other user-defined profiles, although other depended-upon user-defined profiles are not illustrated in this example.

The controls 235 of the user-defined profile 230 include an include_control 233a to indicate that all controls 251 in predefined profile 250 are to be executed as part of the user-defined profile 230 when the user-defined profile 230 is executed. The controls 235 also include an include control 233b to indicate that all controls 262, except control 262b, in predefined profile 260 are to be executed as part of the user-defined profile 230 when the user-defined profile 230 is executed. As a result, controls 262a, 262c, and 262d are incorporated into the user-defined profile 230. The controls 235 also include a require_control 234 to identify one or more specific controls 272 in predefined profile 270 to be executed as part of the user-defined profile 230 when the user-defined profile 230 is executed, which in this example includes control 272c. As a result, control 272c is incorporated into the user-defined profile 230.

Given the sample profile structure described in FIGS. 2A and 2B, FIG. 2C illustrates one example of a sample profile that is checking two different ports to make sure that a more secure port is listening, while a less secure port is not listening. Sample profile 280 illustrates a portion of a control that is checking to see if the local computing system is listening to port 443 and ignoring port 80. As described elsewhere herein, a user (e.g., a user of client computing system(s) 107 of FIG. 1) may utilize the CET system (e.g., CET Configuration component 116 of CET system 114 of FIG. 1) to define and configure the sample profile 280. In various embodiments, a user may define a criticality of one or more of the compliance tests of a control, such as is illustrated by the example field "its ('criticality') {should be_high}". The criticality can be used by the CET system 114 to modify the results provided to the user if that compliance test fails or is unsatisfied, as shown in results 282, and/or to implement additional predetermined automated operations to correct the failure. The user can then utilize the CET system (e.g., CET Deployment component 118 of CET system 114 of FIG. 1) to execute a command 281, such as via a command line interface, which in this example executes the profile 280, with the "<CET>" system referring to a name of the CET system. As a result of the execution of profile 280, the CET system in this example displays results 282 to the user identifying which tests have passed and which tests have failed. In this illustration, port 80 should not be listening, but it is, and it is designated as a high criticality. Accordingly, the results 282 indicate that there is a high criticality failure and the user can take corrective action to modify the system so that it is no longer listening to port 80, while the CET System can perform automated actions to correct the non-compliant port in other embodiments (e.g., by executing corrective code that is indicated by or otherwise associated with the control and/or test that failed). In various embodiments, the CET system can perform these automated actions on all failures, predetermined failures, failures with specified criticality levels, or other predetermined or user-defined failures.

It will be appreciated that the examples of FIGS. 2A-2C have been simplified for the purposes of explanation, and that the number and organization of profiles, controls, tests, computing resources, etc. may be much larger than what is depicted. Similarly, in other embodiments, corresponding information and functionality may be stored and managed in other manners.

Figure 3:
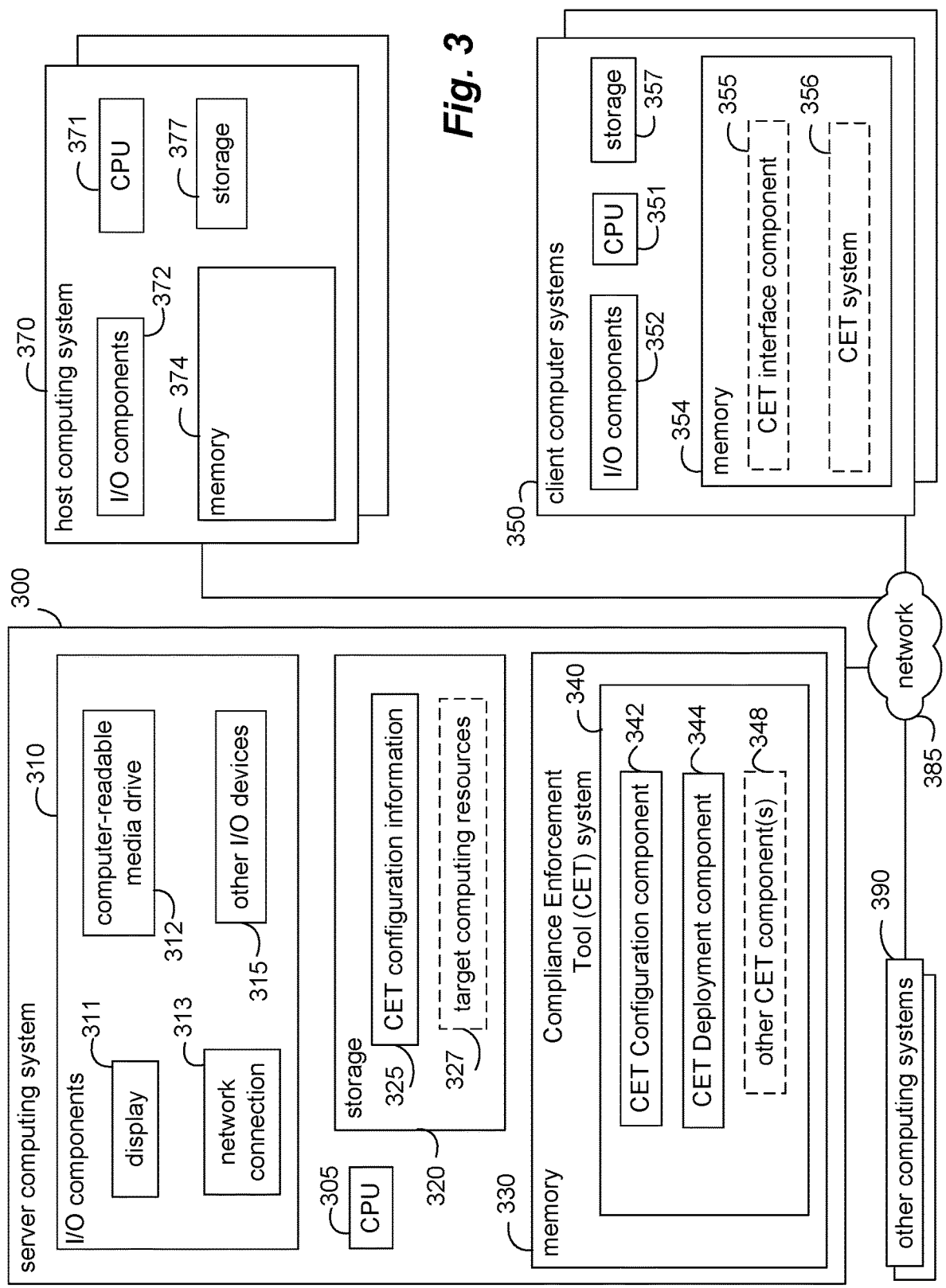
FIG. 3 is a block diagram illustrating example computing systems suitable for providing a Compliance Enforcement Tool ("CET") system for performing compliance testing.

FIG. 3 is a block diagram illustrating example computing systems suitable for managing execution of an embodiment of the CET system, including employing one or more compliance profiles to test one or more target computing resources in one or more target computing environments to determine if those resources are in compliance with one or more standards or other compliance criteria, as discussed briefly with respect to FIG. 3, and in greater detail elsewhere herein. In this example, a server computing system 300 executes an embodiment of a CET System 340, such as based on instructions received from one or more clients using one or more client computer systems 350, and may perform operations similar to those of client computing system(s) 107 of FIG. 1.

The CET System 340 in this example includes a CET Configuration component 342 to enable a client to configure one or more compliance profiles, which may include defining one or more testing implementation modules (TIM) and/or one or more controls to test one or more computing resources on one or more target computing environments. Profiles (e.g., user-defined profiles and/or predefined profiles), controls (e.g., user-defined controls and/or predefined controls), and TIMs (e.g., user-defined TIMs and/or predefined TIMs) are stored in CET configuration information 325 on storage 325 (e.g., in one or more databases or files), although in some embodiments some or all such information may instead be stored on a client computer system 350 (e.g., to store user-defined profiles, controls and/or TIMs on storage 357 of one or more client computer systems of the users who defined them). The CET System also includes a CET Deployment component 344 to deploy one or more compliance profiles (e.g., stored in CET configuration information 325) on one or more target computing environments, such as on system 300, host computing systems 370, other computing systems 390, and/or the client computer systems 350—such deployment activities may, for example, be performed based on instructions received from clients using client computer systems 350, and with interactions between the systems 300, 350, 370 and 390 occurring in this example over one or more computer networks 385 (e.g., an internal network of a data center, not shown, that includes some or all of the computing systems 300, 350, 370, and 390; one or more public networks, such as the Internet; etc.).

In this example embodiment, computing system 300 includes one or more hardware CPU ("central processing unit") processors 305, local storage 320, memory 330, and various I/O ("input/output") components 310, with the illustrated I/O components in this example including a display 311, a network connection 313, a computer-readable media drive 312, and other I/O devices 315 (e.g., a keyboard, mouse, speakers, microphone, etc.). In the illustrated embodiment, the CET System 340 is executing in memory 330, and may include one or more CET Configuration components 342, CET Deployment components 344, and/or one or more optional other CET components 348, as described above. In addition, the storage 320 provides storage for the CET system, such as to include a repository or other storage for CET configuration information 325 and optionally target computing resources 327, although some or all such information may instead be stored in other locations in other embodiments. The other systems 350, 370 and 390 may each similarly include hardware processors (e.g., one or more CPUs 371 of each system 370, one or more CPUs 351 of each system 350, one or more CPUs of each other system 390, etc.), storage (e.g., storage 377 of each system 370, storage 357 of each system 350, other storage of each other system 390, etc.), memory (e.g., memory 374 of each system 370, memory 354 of each system 350, other memory of each other system 390, etc.) and I/O components (e.g., I/O components 372 of system 370, I/O components 352 of system 350, other I/O components of other systems 390, etc.), although less details are illustrated for the other systems in this example for the sake of brevity.

Each computing system 370 in this example includes a CPU 371, local storage 377, memory 374, and various I/O components 372 (e.g., I/O components similar to I/O components 310 of server computing system 300). Other programs may additionally be executed in memory, and other programs and/or data may additionally be stored on storage.

Each client computer system 350 in this example includes a CPU 351, local storage 357, memory 354, and various I/O components 352 (e.g., I/O components similar to I/O components 310 of server computing system 300). In the illustrated embodiment, a CET system 356 may optionally be executing in memory 354, whether in addition to or instead of CET 340 of system 300, such as to allow a customer operating the system 350 to locally execute a copy of the CET system to configure and deploy one or more compliance profiles in a local computing environment. In other embodiments, the memory 354 may instead include a CET interface component 355 (e.g., a browser program, a client-side component specific to the CET system, etc.) that communicates over network 385 with the CET system 340 of system 300 to obtain such functionality, and/or over network 385 with host computing systems 370 and/or 390 to deploy one or more compliance profiles on those systems.

The other computing systems 390 may further include other proximate or remote computing systems of various types in at least some embodiments, including one or more security servers, storage repositories, etc.

It will be appreciated that the illustrated systems are merely illustrative and are not intended to limit the scope of the present invention. For example, systems 300, 350, 370 and/or 390 may be connected to other devices that are not illustrated, including through network 385 and/or one or more other networks, such as the Internet or via the World Wide Web ("Web"). More generally, a "client" or "server" computing system or device may in some embodiments comprise any combination of hardware that can interact and perform the described types of functionality, such as when programmed or otherwise configured with software, including without limitation desktop computers, laptop computers, slate computers, tablet computers, embedded computers, specialized hardware such as ASICs or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated system 340 and/or its components may include executable software instructions and/or data structures in at least some embodiments, which when loaded on and/or executed by particular computing systems or devices may be used to program or otherwise configure those systems or devices, such as to configure processors of those systems or devices. Alternatively, in other embodiments, some or all of the software components and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. Furthermore, the functionality provided by the illustrated system components may in some embodiments be combined in fewer components or distributed in additional components. Similarly, in some embodiments the functionality of some of the illustrated components may not be provided and/or other additional functionality may be available.

Thus, in at least some embodiments, the illustrated components and/or systems are software-based components/systems including software instructions that, when executed by the CPU(s) 305, CPU(s) 371 and/or CPU(s) 351 and/or other processor means, program the processor(s) to automatically perform the described operations for that component/system. Furthermore, in some embodiments, some or all of the components and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, components or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
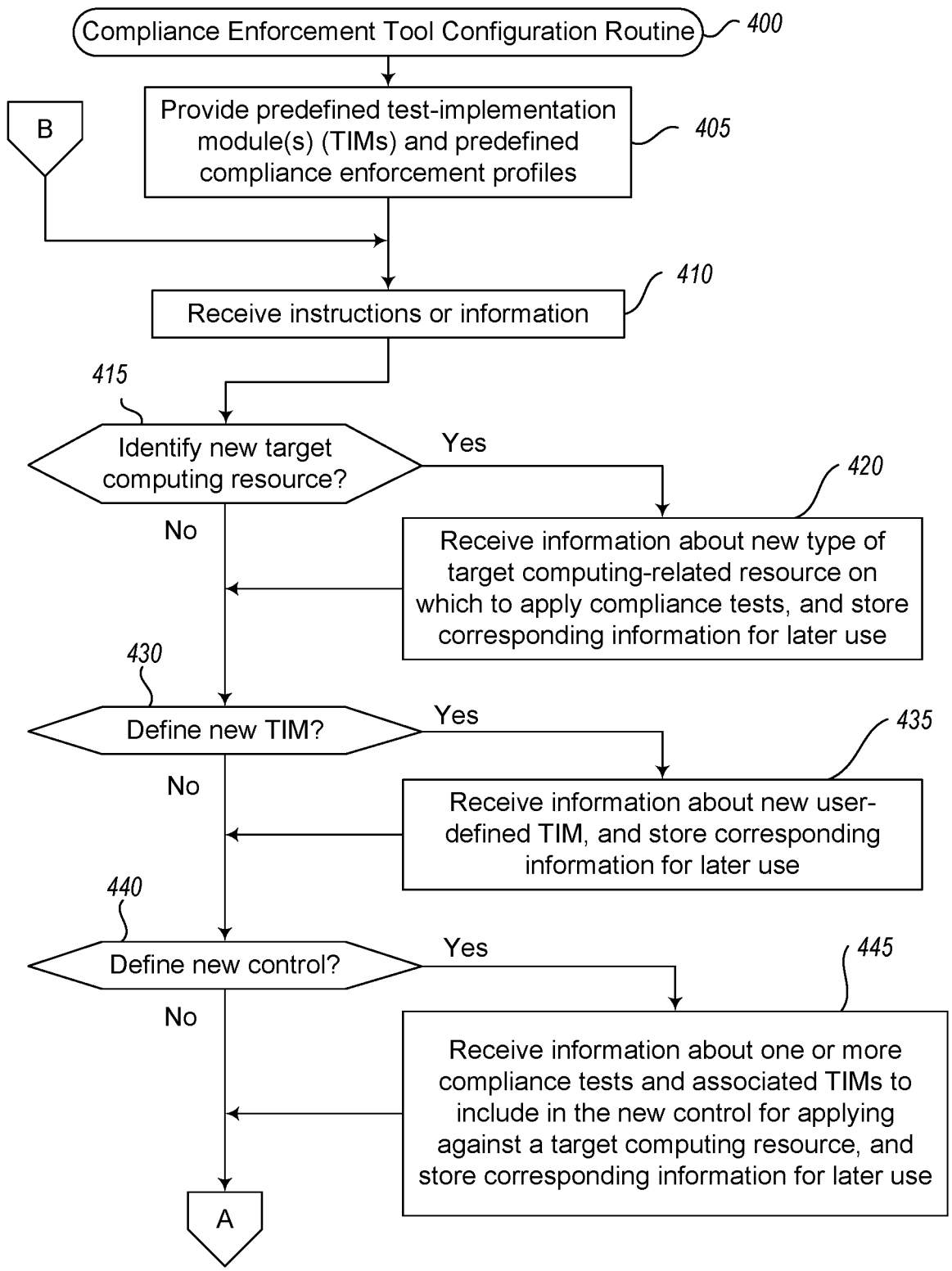
FIG. 4A-4B illustrates a flow diagram of an example embodiment of a CET Configuration routine.
Figure 4B:
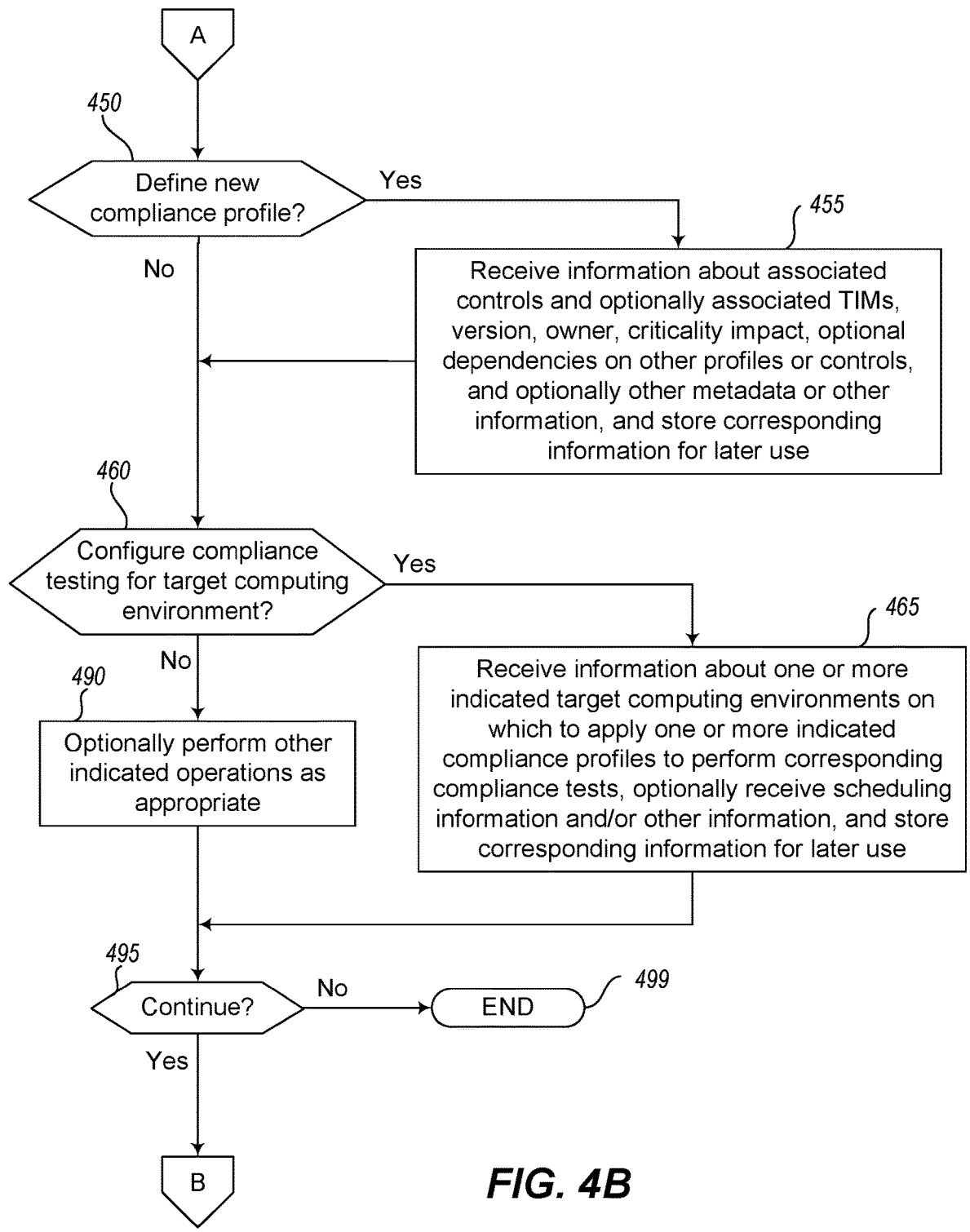

FIGS. 4A-4B illustrate a flow diagram of an example embodiment of a Compliance Enforcement Tool Configuration routine 400. The routine may be provided by, for example, execution of CET Configuration component 342 of CET system 340 of FIG. 3 and/or CET Configuration component 116 of CET system 114 of FIG. 1 and/or one or more CET Configuration components (not shown) used to specify the compliance information discussed with respect to FIGS. 2A-2C, such as to configure one or more compliance profiles, controls and/or TIMs. Once the compliance profiles are configured, the CET Deployment routine illustrated in FIG. 5 may be employed to execute the profiles, such as with respect to particular specified target computing environments.

In the illustrated embodiment, the routine 400 begins at block 405, where one or more predefined test-implementation modules (TIMs) and predefined compliance enforcement modules profiles including predefined controls are provided, although in other embodiments some or all such predefined elements may not be provided. After block 405, the routine continues to block 410 to obtain instructions or information, such as instructions or information associated with the setup and configuration of one or more compliance profiles.

After block 410, the routine continues to block 415 to determine whether the information received in block 410 includes an identification of a new target computing resource. If so, the routine continues to block 420 to receive information about the new type of computing-related resource on which to apply compliance tests, and to store corresponding information for later use.

After block 420, or if it is instead determined in block 415 that the instructions received in block 410 were not to identify a new target computing resource, the routine continues to block 430 to determine whether the information or instructions received in block 410 include a request to define a new TIM. If so, the routine continues to block 435 to receive information about one or more new user-defined TIMs, and store corresponding information for later use.

After block 435, or if it is instead determined in block 430 that the instructions received in block 410 were not to define a new TIM, the routine continues to block 440 to determine whether the information or instructions received in block 410 include a request to define one or more new controls. If so, the routine continues to block 445 to receive information about one or more compliance tests and associated TIMs to include in the new control(s) for applying against the indicated target computing resource identified in block 410, and to store corresponding information for later use.

After block 445, or if it is instead determined in block 440 that the instructions received in block 410 were not to define a new control, the routine continues in FIG. 4B to block 450 to determine whether the information or instructions received in block 410 include a request to define a new compliance profile. If so, the routine continues to block 455 to receive information about associated controls and optionally associated TIMs, version, owner, criticality impact, optional dependencies on other profiles or controls, and optionally other metadata or other information. The corresponding profile information is stored for later use.

After block 455, or if it is instead determined in block 450 that the instructions received in block 410 were not to define a new compliance profile, the routine continues to block 460 to determine whether the information or instructions in block 410 include a request to configure compliance testing for a target computing environment. If so, the routine continues to block 465 to receive information about one or more indicated target computing environments on which to apply one or more indicated compliance profiles to perform corresponding compliance tests. In some embodiments, this received information optionally includes scheduling information on when to execute a compliance test and/or other information, and/or specifying corrective automated operations to perform if a compliance test or profile fails or otherwise indicates a problem. The corresponding information is stored for later use.

After block 465, or if it is instead determined in block 460 that the instructions received in block 410 did not include a request to configure of compliance testing for a target computing environment, the routine continues instead to block 490 to optionally perform one or more other indicated operations as appropriate. Non-exclusive examples of such other operations include other interactions by customers with the CET system (e.g., to register with the system, to specify preferences, to check the status of currently or previously executed compliance testing, to provide payment or other administrative information, etc.), receiving and storing (or otherwise handling) errors or other status information, doing updates as specified (e.g., updates to the CET system, to pre-existing controls or TIMs, etc., such as when the updates are available), managing interactions with a surrounding computing environment (e.g., to define corrective actions if a compliance test is not satisfied), receiving and storing information about particular automated corrective actions to take in particular situations (e.g., in association with one or more predefined controls and/or TIMs, such as to perform if the control(s) and/or TIM(s) fail), etc.

After blocks 465 or 490, the routine continues to block 495 to determine whether to continue, such as until an explicit indication to terminate is received (e.g., from the customer, the CET system, etc.). If it is determined to continue, the routine returns to block 410 to wait for other information or instructions, and otherwise continues to block 499 and ends.

Figure 5:
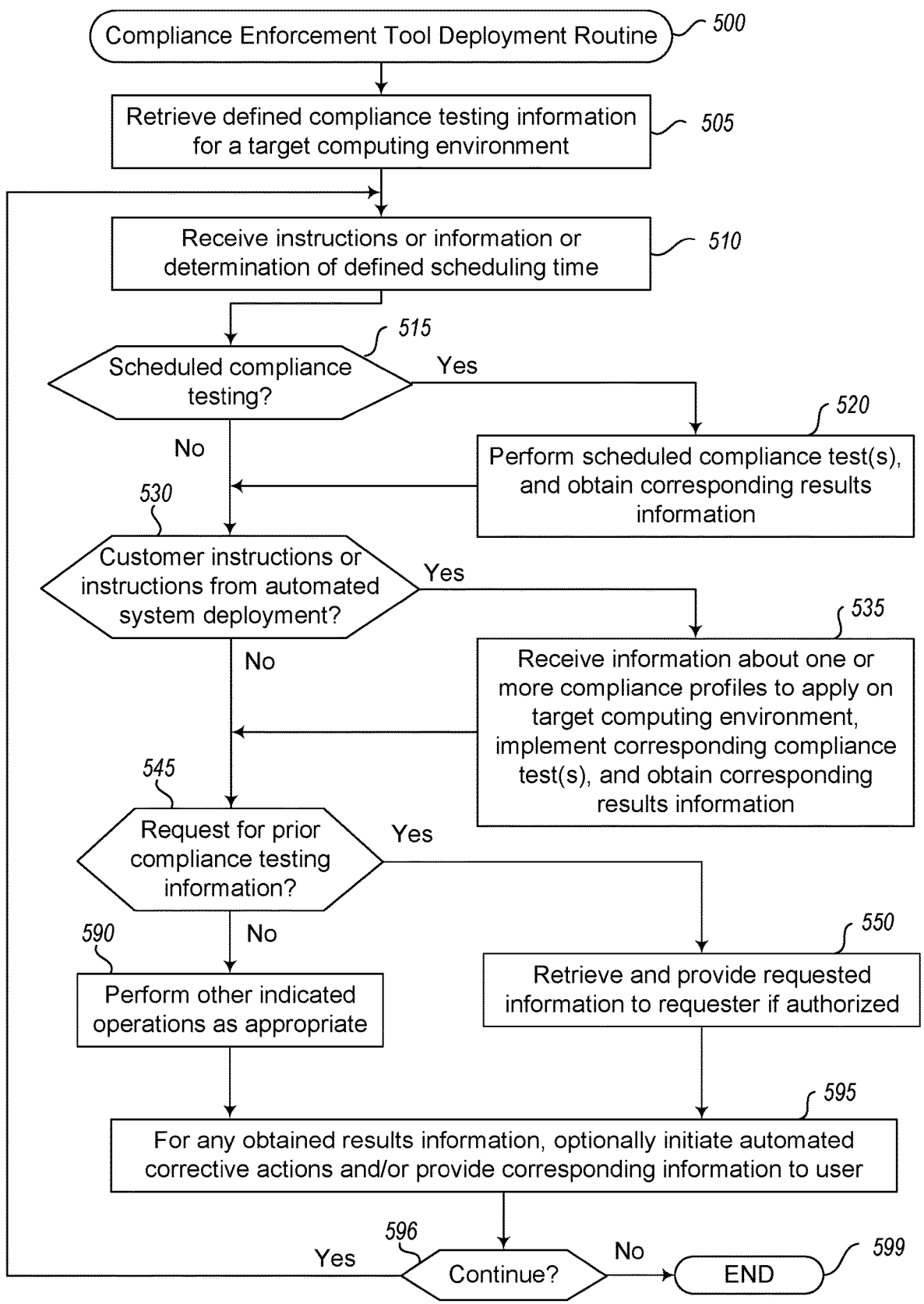
FIG. 5 illustrates a flow diagram of an example embodiment of a CET Deployment routine.

FIG. 5 illustrates a flow diagram of an example embodiment of a Compliance Enforcement Tool (CET) Deployment routine 500. The routine may be provided by, for example, execution of CET Deployment component 344 of CET system 340 of FIG. 3 and/or CET Deployment component 118 of CET system 114 of FIG. 1 and/or one or more CET Deployment components (not shown) used to deploy compliance testing discussed with respect to FIGS. 2A-2C, such as to deploy one or more compliance profiles on one or more target computing environments at the request of a client or in an automated configured manner (e.g., upon software code check-in, compilation, deployment, etc.).

The illustrated embodiment of the routine begins at block 505 where defined compliance testing information for a target computing environment is retrieved, such as compliance testing information previously specified using a CET Configuration component as discussed with respect to FIGS. 4A-4B. The routine then continues to block 510, where information, instructions, or determination of a predefined scheduling time are received.

The routine then continues to block 515 to determine if a predefined scheduling time has been reached, and indicated in block 510—for example, an automated compliance scheduler may schedule one or more different compliance tests to execute on or be applied to one or more target computing environments at predetermined times, at pre-defined time intervals, when one or more configuration settings or characteristics of the target computing environment has changed, when one or more defined events occur, etc. If such a compliance test has been scheduled or otherwise indicated to occur at the current time, the routine continues to block 520 to perform the compliance test(s). Corresponding results information is obtained in response to the execution of the compliance test(s), and may be provided to a client or stored for later retrieval, as well as optionally further used with respect to block 595.

After block 520, or if it was instead determined in block 515 that the information or instructions received in block 510 were not for scheduled compliance testing, the routine continues to block 530 to determine whether the information or instructions received in block 510 are instead customer instruction or instructions from an automated system deployment initiating the application or execution of one or more compliance profiles. If so, the routine continues to block 535 to receive information about one or more compliance profiles to apply on one or more target computing environments (e.g., by retrieving information specified in the instructions of block 510). The one or more compliance tests that correspond to the compliance profiles are implemented and corresponding results information is obtained and used in a manner similar to that discussed with respect to block 520.

After block 535, or if it is instead determined in block 530 that the instructions received in block 510 were not customer instructions or instructions from an automated system to apply one or more compliance profiles, the routine continues to block 545 to determine whether the information or instructions in block 510 includes a request for prior compliance testing information. If so, the routine continues to block 550 to retrieve and provide requested information to the requester, such as after optionally determining (if the routine is so configured) that the requester is authorized to view or receive such information.

If it is instead determined in block 545 that the information or instructions received in block 510 were not requests for prior compliance testing information, the routine continues to block 590 to perform one or more other indicated operations as appropriate. Non-exclusive examples of such other operations include other interactions by customers with the CET system (e.g., to register with the system, to specify preferences, to provide payment or other administrative information, etc.), receiving and storing (or otherwise handling) errors or other status information, doing specified updates (e.g., updates to the CET system, to pre-existing controls or TIMs, etc.), managing interactions with an indicated computing environment (e.g., to define corrective actions if a compliance test is not satisfied), etc.

After blocks 550 or 590, the routine continues to block 595 to optionally initiate automated corrective actions and/or provide corresponding information to the user for any results information obtained in blocks 520 and/or 535. After block 595, the routine continues to block 596, where it determines whether to continue, such as until an explicit indication to terminate is received. If it is determined to continue, the routine returns to block 510 and waits for additional information or instructions, or instead proceeds to block 599 and ends.

Additional details of one or more non-exclusive example embodiments of a CET system and its predefined compliance profiles, controls and TIMs are included in U.S. Provisional Patent Application No. 62/416,560, filed Nov. 2, 2016 and entitled "Compliance Enforcement Tool For Computing Environments," which is hereby incorporated by reference in its entirety.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different manners in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
receiving a first compliance profile incorporating one or more compliance tests, wherein:
the one or more compliance tests are to be implemented in a specified target execution environment to determine compliance of the specified target execution environment when executing a software component,
the one or more compliance tests incorporated in the first compliance profile include an inherited compliance test,
the inherited compliance test associated with an original target execution environment and at least partially testing compliance when the original target execution environment executes the software component, wherein the original target execution environment differs from the specified target execution environment,
the inherited compliance test including a portion inapplicable to the specified target execution environment, the portion inapplicable to the specified target execution environment associated with one or more of:
a first type of the original target execution environment for the inherited compliance test, and
a first functionality of the original target execution environment for the inherited compliance test;
automatically executing, based at least in part on the inherited compliance test being part of the first compliance profile, the inherited compliance test, which includes the portion that is inapplicable to the specified target execution environment, automatically on at least one first computing resource in the specified target execution environment, wherein one or more of:
the portion that is inapplicable to the specified target environment is inapplicable based on a type-based incompatibility, wherein the first type of the original target execution environment is incompatible with a second type of the specified target execution environment, and
the portion that is inapplicable to the specified target execution environment being inapplicable based on a functionality-based incompatibility, wherein the first functionality of the original target execution environment is incompatible with a second functionality of the specified target execution environment;
wherein the portion of the inherited compliance test included in the inherited compliance test and inapplicable to the specified target execution environment is automatically ignored due to one or more of the type-based incompatibility and the functionality-based incompatibility, and
wherein the inherited compliance test is automatically executed without error despite one or more of the type-based incompatibility and the functionality-based incompatibility between the specified target execution environment associated with the first compliance profile and the original target execution environment associated with the inherited compliance test; and
providing information about results from the execution of the inherited compliance test in the specified target execution environment.

2. The computer-implemented method of claim 1, wherein the inherited compliance test includes a control incompatible with the specified target execution environment.

3. The computer-implemented method of claim 1, wherein the inherited compliance test is inherited based on a user-specified dependency relationship between the first compliance profile and a second compliance profile, wherein the second compliance profile applied to determine compliance of the original target execution environment.

4. The computer-implemented method of claim 3, wherein the user-specified dependency relationship between the first compliance profile and the second compliance profile further specifies a subset of compliance tests associated with the second compliance profile by excluding a specified second subset of tests associated with the second compliance profile.

5. The computer-implemented method of claim 3, wherein the second compliance profile includes multiple compliance profiles, wherein the user-specified dependency relationship further specifies a hierarchy of the multiple compliance profiles, and wherein the method further comprises excluding, from the first compliance profile, at least one control from one of the multiple compliance profiles based at least in part on another control that is included from another of the multiple compliance profiles with a higher priority in the hierarchy.

6. The computer-implemented method of claim 3, wherein a user is an end user of a computing system compliance enforcement tool, the computer-implemented method including:
creating the first compliance profile as a new compliance profile.

7. The computer-implemented method of claim 6, wherein the computing system compliance enforcement tool provides a plurality of predefined compliance profiles for use by a plurality of end users, and wherein a second compliance profile is selected from the plurality of predefined compliance profiles by the user.

8. The computer-implemented method of claim 6 further comprising receiving, by the computing system compliance enforcement tool, and for a second user who is separate from the user and is associated with the specified target execution environment, second instructions from the second user to execute the first compliance profile in the specified target execution environment, and wherein the executing of the first compliance profile in the specified target execution environment is executed in response to the second instructions.

9. The computer-implemented method of claim 1 wherein the first compliance profile includes a user-specified level of criticality of at least one compliance test incorporated in the first compliance profile, and wherein the executing of the first compliance profile includes using the user-specified level of criticality.

10. The computer-implemented method of claim 1 further comprising receiving information from a user for one or more criteria to use with the first compliance profile to determine when to execute the first compliance profile, and wherein the executing of the first compliance profile in the specified target execution environment is based at least in part on the one or more criteria being satisfied for the specified target execution environment.

11. The computer-implemented method of claim 1 further comprising automatically executing one or more corrective actions when at least one compliance test incorporated in the first compliance profile fails for the specified target execution environment.

12. The computer-implemented method of claim 1 wherein the specified target execution environment includes an online program execution environment.

13. The computer-implemented method of claim 1 wherein the specified target execution environment includes a first computing resource and a second computing resource that each include one or more computer systems and one or more storage devices operated by an organization associated with a user.

14. The computer-implemented method of claim 1 wherein the specified target execution environment includes one or more of a virtual machine, a virtualized container, and a bare-metal computer hardware system, and wherein the execution of the inherited compliance test includes checking one or more software programs executing on the specified target execution environment.

15. The computer-implemented method of claim 1 wherein the specified target execution environment includes a specified data storage structure stored on one or more storage devices, the specified data storage structure including at least one of a file or a database or a directory, and wherein the execution of the inherited compliance test includes checking a status associated with the specified target execution environment.

16. The computer-implemented method of claim 1 wherein the specified target execution environment includes at least one of a defined application programming interface (API) or a connection endpoint, and wherein the execution of the inherited compliance test includes checking operations of the specified target execution environment.

17. The computer-implemented method of claim 1, wherein the at least one first computing resource and at least one second computing resource are a single computing resource.

18. The computer-implemented method of claim 1, wherein one or more of the first type and the first functionality are associated with a first operating system and wherein one or more of the second type and the second functionality are associated with a second operating system.

19. A non-transitory computer-readable medium having stored contents that cause one or more computing systems to execute automated operations comprising:
  receive a first compliance profile incorporating one or more compliance tests, wherein:
    the one or more compliance tests are to be implemented in a specified target execution environment to determine compliance of the specified target execution environment when executing a software component,
    the one or more compliance tests incorporated in the first compliance profile include an inherited compliance test,
    the inherited compliance test associated with an original target execution environment and at least partially testing compliance when the original target execution environment executes the software component, wherein the original target execution environment differs from the specified target execution environment,
    the inherited compliance test including a portion inapplicable to the specified target execution environment, the portion inapplicable to the specified target execution environment associated with one or more of:
      a first type of the original target execution environment for the inherited compliance test, and
      a first functionality of the original target execution environment for the inherited compliance test;
  automatically execute, based at least in part on the inherited compliance test being part of the first compliance profile, the inherited compliance test, which includes the portion that is inapplicable to the specified target execution environment, automatically on at least one first computing resource in the specified target execution environment, wherein one or more of:
    the portion that is inapplicable to the specified target environment is inapplicable based on a type-based incompatibility wherein the first type of the original target execution environment is incompatible with a second type of the specified target execution environment, and
    the portion that is inapplicable to the specified target execution environment being inapplicable based on a functionality-based incompatibility wherein the first functionality of the original target execution environment is incompatible with a second functionality of the specified target execution environment;
  wherein the portion of the inherited compliance test included in the inherited compliance test and inapplicable to the specified target execution environment is automatically ignored due to one or more of the type-based incompatibility and the functionality-based incompatibility; and
  wherein the inherited compliance test is automatically executed without error despite one or more of the type-based incompatibility and the functionality-based incompatibility between the specified target execution environment associated with the first compliance profile and the original target execution environment associated with the inherited compliance test; and
  provide information about results from the execution of the inherited compliance test in the specified target execution environment.

20. A system comprising:
one or more storage devices containing stored instructions; and
one or more processors, that, when executing the stored instructions, cause the system to:
receive a first compliance profile incorporating one or more compliance tests, wherein:
  the one or more compliance tests are to be implemented in a specified target execution environment to determine compliance of the specified target execution environment when executing a software component,
  the one or more compliance tests incorporated in the first compliance profile include an inherited compliance test,
  the inherited compliance test associated with an original target execution environment and at least partially testing compliance when the original target execution environment executes the software component, wherein the original target execution environment differs from the specified target execution environment,
  the inherited compliance test including a portion inapplicable to the specified target execution environment, the portion inapplicable to the specified target execution environment associated with one or more of:
  a first type of the original target execution environment for the inherited compliance test, and
  a first functionality of the original target execution environment for the inherited compliance test;
automatically execute, based at least in part on the inherited compliance test being part of the first compliance profile, the inherited compliance test, which includes the portion that is inapplicable to the specified target execution environment, automatically on at least one first computing resource in the specified target execution environment, wherein one or more of:
  the portion that is inapplicable to the specified target environment is inapplicable based on a type-based incompatibility wherein the first type of the original target execution environment is incompatible with a second type of the specified target execution environment and
  the portion that is inapplicable to the specified target environment being inapplicable based on a functionality-based incompatibility wherein the first functionality of the original target execution environment is incompatible with a second functionality of the specified target execution environment;
wherein the portion of the inherited compliance test included in the inherited compliance test and inapplicable to the specified target execution environment is automatically ignored due to one or more of the type-based incompatibility and the functionality-based incompatibility; and
wherein the inherited compliance test is automatically executed without error despite one or more of the type-based incompatibility and the functionality-based incompatibility between the specified target execution environment associated with the first compliance profile and the original target execution environment associated with the inherited compliance test; and
provide information about results from the execution of the inherited compliance test in the specified target execution environment.

\* \* \* \* \*